(12) United States Patent
Wilds et al.

(10) Patent No.: US 11,936,991 B2
(45) Date of Patent: Mar. 19, 2024

(54) EO/IR IMAGING SYSTEM WITH A MEMS MMA CONFIGURED TO PREVENT SATURATION OF THE IMAGING DETECTOR

(71) Applicant: Raytheon Company, Tewksbury, MA (US)

(72) Inventors: Andrew M. Wilds, Sahuarita, AZ (US); Craig O. Shott, Benson, AZ (US); Thomas Sanderson, Sahuarita, AZ (US)

(73) Assignee: Raytheon Company, Tewksbury, MA (US)

( * ) Notice: Subject to any disclaimer, the term of this patent is extended or adjusted under 35 U.S.C. 154(b) by 311 days.

(21) Appl. No.: 17/397,644

(22) Filed: Aug. 9, 2021

(65) Prior Publication Data
US 2023/0043382 A1 Feb. 9, 2023

(51) Int. Cl.
*G02B 26/10* (2006.01)
*H04N 23/55* (2023.01)
(Continued)

(52) U.S. Cl.
CPC ............ *H04N 23/75* (2023.01); *G02B 26/10* (2013.01); *H04N 23/55* (2023.01);
(Continued)

(58) Field of Classification Search
CPC .. G02B 26/0816; G02B 26/10; G02B 26/101; G02B 26/105; G02B 26/12;
(Continued)

(56) References Cited

U.S. PATENT DOCUMENTS 10,444,492 B2 10/2019 Hopkins et al.
10,873,730 B2 * 12/2020 Malfait ............... H04N 5/7441
(Continued)

OTHER PUBLICATIONS

"MEMS Mirror Array—Beam Steering Mode", [Online]. Retrieved from the Internet: <www.youtube.com/watch?v=wHIUU3kKtzM>, (Aug. 10, 2017), 2 pgs.
(Continued)

*Primary Examiner* — Antoinette T Spinks
(74) *Attorney, Agent, or Firm* — Schwegman Lundberg & Woessner, P.A.

(57) ABSTRACT

An EO/IR optical imaging system comprises collection optics to collect light from a scene into a collimated or near-collimated space. An imaging detector is positioned at the image plane and configured to integrate incident light (radiant flux or photons) over an image frame and readout a sequence of pixelated images at a frame rate, said detector exhibiting a saturation threshold. To prevent saturation of the imaging detector, a MEMS MMA is positioned in the collimated or near-collimated space. A secondary detector (via a pick-off) samples light from the collimated or near-collimated space multiple times per image frame. A controller responsive to the sampled light commands a percentage of the mirrors to re-direct light incident on those mirrors to a light dump and commands the remaining mirrors to re-direct light incident on those mirrors to the imaging detector. Together the mirrors adjust a fraction of light reaching the imaging detector such that the integrated incident light for a given image frame is less than the saturation threshold.

21 Claims, 7 Drawing Sheets

(51) Int. Cl.
*H04N 23/75* (2023.01)
*G02B 26/08* (2006.01)
*G02B 26/12* (2006.01)

(52) U.S. Cl.
CPC ........ *G02B 26/0816* (2013.01); *G02B 26/105* (2013.01); *G02B 26/12* (2013.01)

(58) Field of Classification Search
CPC .... G02B 26/0833; H04N 23/11; H04N 23/55; H04N 23/75; G01S 17/931; G01S 17/933; G01S 17/66; G01S 17/88; G01S 17/89; G01S 7/4811; G01S 7/4817; G01J 3/0291; F41G 7/2293
See application file for complete search history.

(56) References Cited

U.S. PATENT DOCUMENTS

2012/0168605 A1   7/2012  Milanovic
2016/0327779 A1*  11/2016 Hillman ............. G02B 21/0032
2019/0066320 A1   2/2019  Uyeno et al.
2019/0364250 A1*  11/2019 Malfait ................. G02B 7/008

OTHER PUBLICATIONS

"Mirrorcle Technologies MEMS Mirrors—Technical Overview", Mirrorcle Technologies, Inc., (2018), 7 pgs.

Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.

Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.

Tsou, et al., "Extended-image spatial tracking technique for deep-space optical downlinks", Proc. SPIE 3762, Adaptive Optics Systems and Technology, (Sep. 27, 1999), 101-109.

Tuantranont, et al., "Optical beam steering using MEMS-controllable microlens array", Sensors and Actuators A: Physical vol. 91, Issue 3, (Jul. 15, 2001), 363-372.

* cited by examiner

|   | -2 | -1 | 0 | +1 | +2 |
|---|----|----|----|----|----|
| 4 | 20% | 30% | 40% | 50% | 60% |
| 3 | 5% | 10% | 20% | 30% | 40% |
| 2 | 0% | 5% | 10% | 20% | 30% |
| 1 | 0% | 0% | 5% | 10% | 20% |
| 0 | 0% | 0% | 0% | 10% | 20% |

AVG INTENSITY (y-axis) / DERIVATIVE INTENSITY (x-axis) — 400

FIG. 7A

|   | 1 | 2 | 3 | 4 |
|---|----|----|----|----|
| 4 | 50% | 40% | 30% | 20% |
| 3 | 40% | 30% | 20% | 10% |
| 2 | 30% | 20% | 10% | 5% |
| 1 | 20% | 10% | 5% | 0% |
| 0 | 0% | 0% | 0% | 0% |

AVG INTENSITY (y-axis) / SUB-FRAME (x-axis) — 402

FIG. 7B

EO/IR IMAGING SYSTEM WITH A MEMS MMA CONFIGURED TO PREVENT SATURATION OF THE IMAGING DETECTOR

BACKGROUND OF THE INVENTION

Field of the Invention

This invention relates to EO/IR (Electro-Optical/Infrared) imaging systems, and more particular to the use of a Micro-Electro-Mechanical System (MEMS) Micro-Mirror Array (MMA) to prevent saturation of the imaging detector.

Description of the Related Art

EO/IR (Electro-Optical/Infrared) imaging systems collect light from a scene to form an image of that scene on a imaging detector that integrates the incident light over a frame and reads out a sequent of pixelated images at a frame rate. The EO/IR system operates in one or more of the visible, ultra-violet (UV) and IR bands.

Electronics for the imaging detector implement a signal or image processing filter, such as a Finite Impulse Response (FIR), which in part controls a gain coefficient for the imaging detector. As shown in FIG. 1, the incident light in the form of photons or radiant flux is integrated over each image frame to form a radiant exposure 10, readout and reset to zero. The imaging detector is characterized by a starvation threshold 12 and a saturation threshold 14. Below the starvation threshold 12, the detector pixels cannot detect the incident light. Above the saturation threshold 14, the detector pixel maxes out or saturates and cannot differentiate higher levels of incident light. Under normal operation, the filter adjusts the gain coefficient to maintain the radiant exposure 10 between the two thresholds.

If a transient optical event occurs in the scene that is very bright, generates a large number of photons in a very short period of time, the radiant exposure 10 may exceed the saturation threshold 14 and saturate the imaging detector. The filter is simply not fast enough to respond to these types of transient events. Although the filter typically updates the gain coefficient every frame, it takes multiple frames, typically three or more, for the filter to respond and compensate for the transient optical event. If a saturation event occurs, at a minimum the event affects the filter and degrades the systems ability to respond for several frames until the transient event passes through the filter. In more extreme cases, the imaging detector and filter enter a recovery mode in which they are reset. This takes even more frames before the system is fully operational. Note, a transient optical event is not simply a bright spot in the FOV. A transient optical event is a spatially large event that fills the FOV and overwhelms the capabilities of the imaging detector and FIR filter.

In some applications, the occasional loss of a few image frames is tolerable. In other applications the loss of a few image frames or even a single image frame can defeat the mission and possibly cause a loss of life.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for preventing saturation of an imaging detector in an EO/IR optical image system.

An EO/IR optical imaging system comprises collection optics to collect light from a scene into a collimated or near-collimated space. A near-collimated space will cause some degree of vignetting of the image, which may be acceptable. An afocal telescope will produce a collimated space. Imaging forming optics receive the collected light and focus the light to form an image at an image plane. An imaging detector is positioned at the image plane and configured to integrate incident light (radiant flux or photons) over an image frame and readout a sequence of pixelated images at a frame rate, said detector exhibiting a saturation threshold.

To prevent saturation, a MEMS MMA is positioned in the collimated or near-collimated space. A secondary detector (via a pick-off) samples light from the collimated or near-collimated space multiple times per image frame. A controller is responsive to the sampled light to command a percentage of the mirrors to re-direct light incident on those mirrors to a light dump and to command the remaining mirrors to re-direct light incident on those mirrors to the image forming optics. Together the mirrors adjust a fraction of light reaching the imaging detector such that the integrated incident light for a given image frame is less than the saturation threshold.

In different embodiments, the pick-off may comprise one or more of the MEMS mirrors, one or more discrete mirrors, a fiber optic or the positioning of the secondary detector itself in the collimated or near-collimated space.

In different embodiments, the secondary detector comprises an analog device such as a photodetector including an avalanche photodiode (APD), p-i-n photodiode or Geiger mode photodiode. The photodetector must have sufficient bandwidth to sample the light 10×, 100× or more times per image frame.

The mirrors in the MEMS MMA must tilt in at least one DOF to selectively re-direct light to the light dump and the imaging detector via the image forming optics. In some embodiments, the mirrors will be configured to tilt in two DOF. In an embodiment, the mirrors are configured to tip, tilt and piston in three DOF. For example, each mirror may rotates about X and Y orthogonal axes, respectively, and translate in a Z axis orthogonal to the XY plane to tip, tilt and piston, respectively. In a 3 DOF embodiment, each mirror is supported at three vertices of a triangle, wherein lines defined by three different pairs of vertices provide three axes at 60 degrees to one another in the XY plane, wherein each mirror pivots about each axes to produce tilt, tip and piston in the XYZ space. In any configuration, the MEMS MMA must have adequate controllability bandwidth to react to the sampling bandwidth of the photodetector.

In a base configuration, all of the remaining mirrors are tilted to the same angles in 1 or 2 DOF and piston in 3 DOF as applicable to preserve the image. In alternate configurations, the controller may superimpose additional tilt or piston onto the mirrors to perform some additional optical function on the light and resulting image such as wavefront correction, adding optical power etc.

The controller updates the command signals to the mirrors multiple times per frame e.g., 10× to 100× or more. The controller may be configured to determine the number of mirrors and the pattern for those mirrors to dump a certain percentage of the light in real-time. Alternately, a plurality of pre-programmed mirror patterns that direct different percentages of light to the light dump may be stored in memory. In either case, the controller may be configured to respond to the amplitude of the sampled light (possibly integrated over some short sampling period) to either determine or select the mirror pattern. Furthermore, the controller may consider one or more derivatives of the sampled light (e.g., is the amplitude increase or decreasing and if so at what rate). If the derivative is positive, the controller may dump more light than would otherwise be dictated by just the amplitude or vice-versa. The controller may also consider at what point in the frame the transient event occurs. If the event occurs early in the frame, the controller may dump more light than if the event occurs later in the frame.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 7A and 7B are plots of sampled light vs derivative of sampled light and sampled light vs sub-interval used to select a pre-programmed mirror patterned to dump a prescribed fraction of the light to prevent saturation.

DETAILED DESCRIPTION OF THE INVENTION

The present invention provides a system and method for preventing saturation of an imaging detector in an EO/IR optical image system. The system uses a high bandwidth secondary detector to sample the incident light in collimated or near collimated space multiple times per image to immediately detect and track a transient optical event and a MEMS MMA in that same space to adjust a fraction of light reaching the imaging detector multiple times per image frame such that the integrated incident light for a given image frame is less than the saturation threshold. The goal of the system is not to image the transient optical events but to mitigate the loss or degradation of image frames and recover of the signal or image processing filter that typically follow such events.

This approach substantially mitigates or even eliminates the loss or degradation of image frames due to transient optical events. This is useful in all applications and critical for certain applications in which the loss or degradation of any image frame can cause mission failure.

An additional benefit of this approach is that for certain applications it facilitates the design and use of a larger aperture to collect more light. This can be very beneficial to detect and otherwise characterize objects under low lighting conditions. Transient optical events that would otherwise saturate the imaging detector due to the larger aperture can be detected and mitigated using the secondary detector and MEMS MMA.

Figure 2:
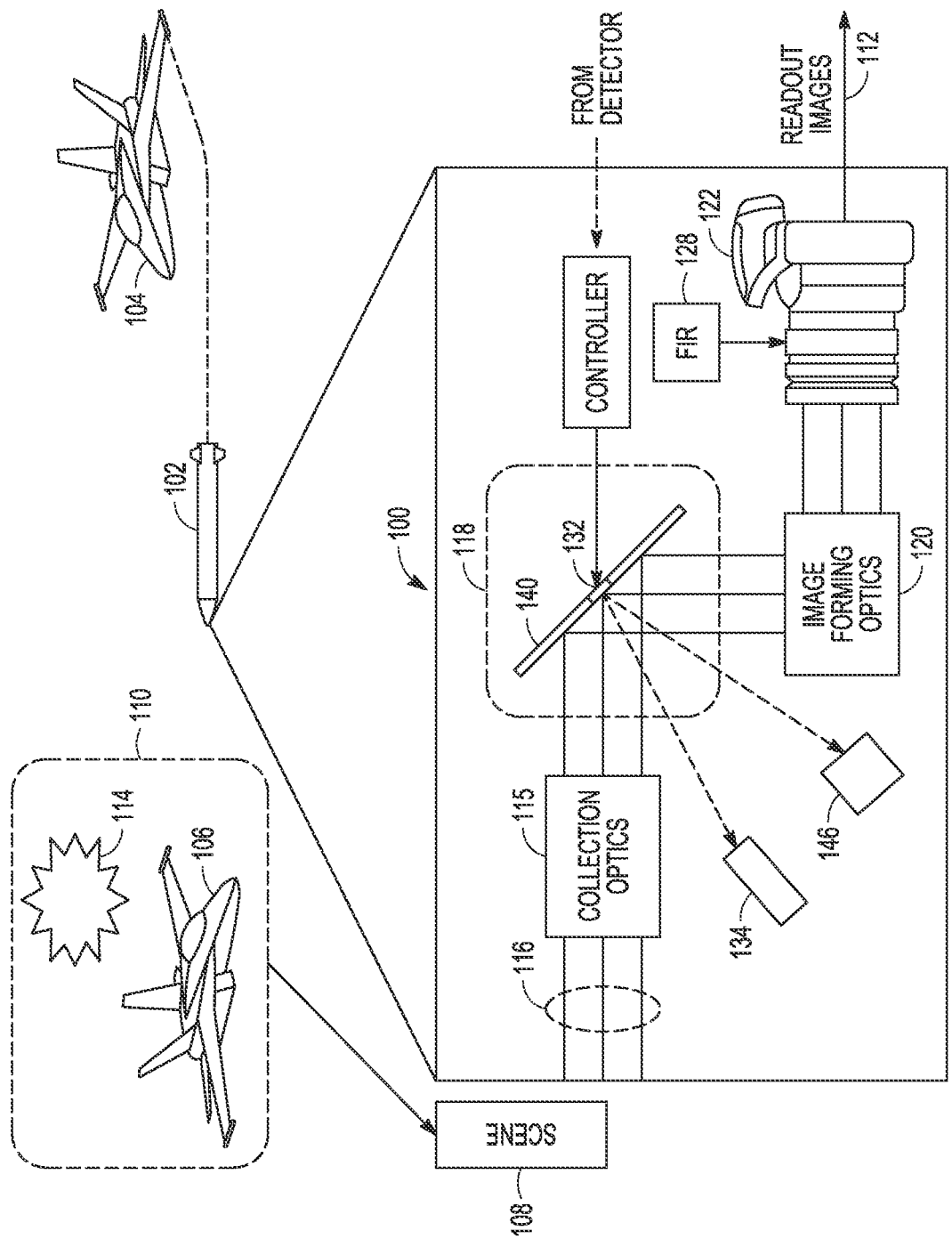
FIG. 2 is a diagram of an EO/IR imaging system including a MEMS MMA configured to prevent saturation of the imaging detector.
Figure 3:
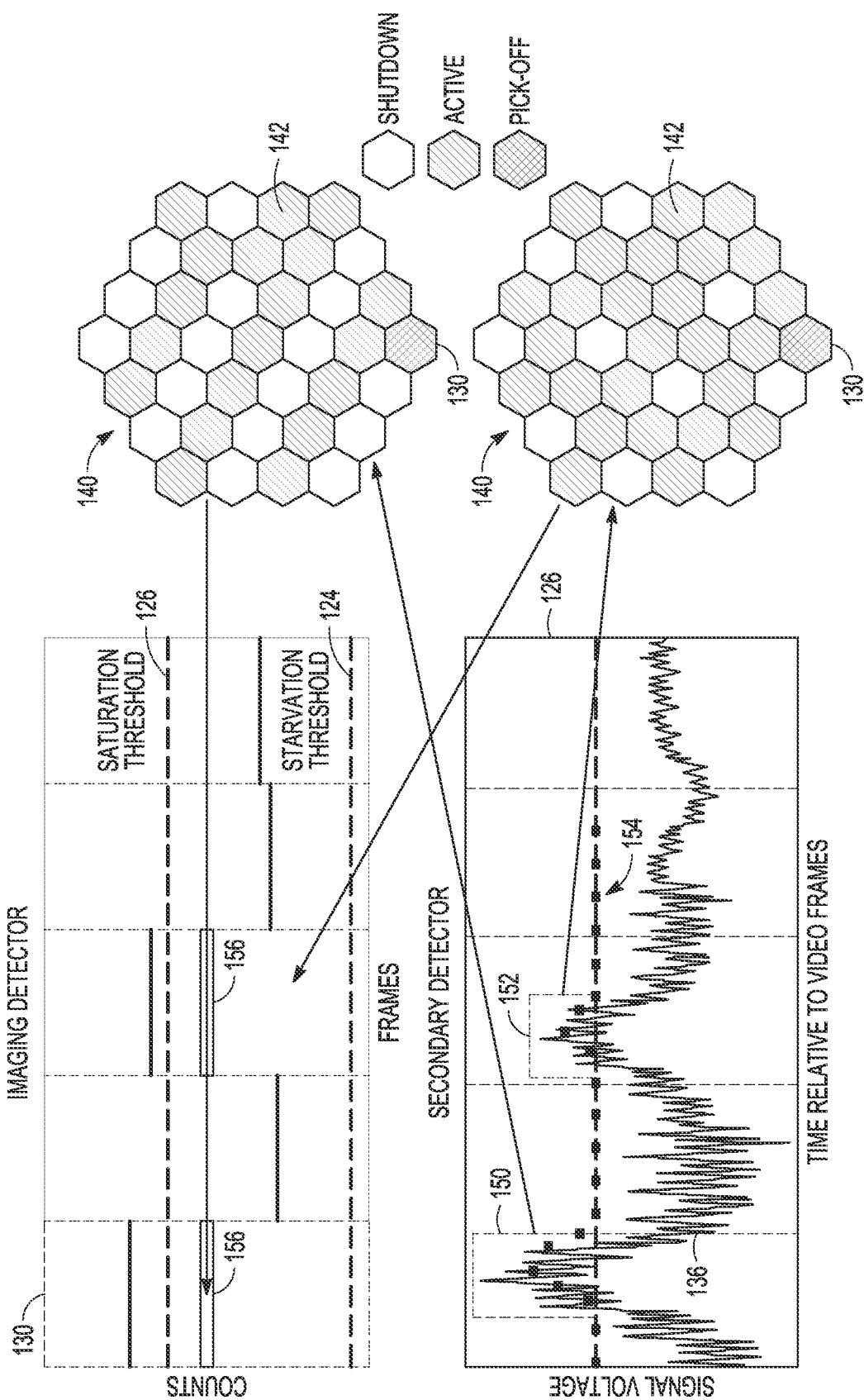
FIG. 3 contains diagrams of sampled light over multiple frames and different configurations of the MEMS MMA to dump a determined fraction of the light such that the radiant exposure is less than the saturation threshold.
Figure 4:
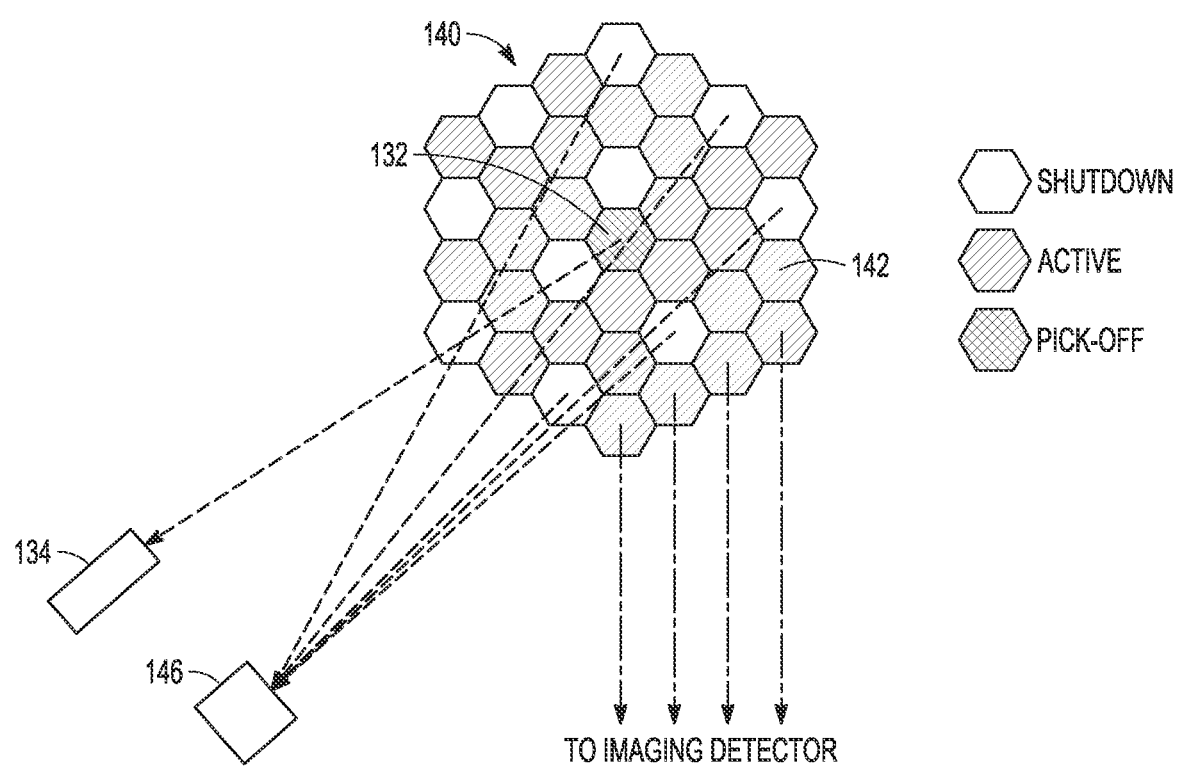
FIG. 4 is a diagram of the MEMS MMA configured to sample the light, dump a fraction of the light and direct the remaining light to the imaging forming optics.

Referring now to FIGS. 2, 3 and 4, in an embodiment an EO/IR imaging system 100 is mounted in the nose of a missile 102 launched from an aircraft 104 to intercept another aircraft 106. The EO/IR imaging system 100 collects light from a scene 108 within a field-of-view (FOV) 110 that includes aircraft 106 and reads out a sequence of images 112 of aircraft 106. The occurrence of a transient optical event 114 within FOV 110 (e.g., countermeasures launched or initiated from aircraft 106 or another platform) can saturate the imaging system thereby temporarily blinding the system. Such an event will at a minimum degrading imaging performance if not result in a complete loss of imaging capability for multiple frames. In this application, loss or degradation of even a few frames can result in loss of track on aircraft 106 and mission failure endangering the aircraft 104 and its pilots.

EO/IR imaging system 100 includes collection optics 115 configured to collect light from scene 108 within FOV 110 through an entrance aperture 116 into a collimated or near-collimated space 118. A near-collimated space will cause some degree of vignetting of the image, which may be acceptable. Collimating optics in the form of an afocal telescope will produce a collimated space. Image forming optics 120 are positioned to receive collected light from the collimated or near-collimated space 118 and focus light to form an image. An imaging detector 122 is positioned at or near the image plane to integrate incident light over an image frame and readout a sequence of pixelated images 112 at a frame rate.

The imaging detector is characterized by a starvation threshold 124 and a saturation threshold 126. Below the starvation threshold 124, the detector pixels cannot detect the incident light. Above the saturation threshold 126, the detector pixel maxes out or saturates and cannot differentiate higher levels of incident light. Under normal operation, an FIR 128 filter adjusts the gain coefficients of imaging detector 122 to maintain the radiant exposure 130 between the two thresholds. Although the FIR filter updates the gain coefficients every frame, the response time of the FIR filter is several frames. It takes the FIR filter multiple frames to adapt to current light conditions and to clear any effects of the conditions. For ordinary variations in lighting conditions of a scene this is effective. However, the response time of the FIR filter can be overwhelmed by very bright very fast transient optical events.

To mitigate these effects, the EO/IR imaging system 100 includes at least one pick-off 132 positioned in the collimated or near-collimated space 118 to sample the light. In collimated or near-collimated space a sample of the light represents the average light level over the FOV. The pick-off may comprise one or more of the MEMS mirrors, one or more discrete mirrors, a fiber optic or the positioning of the secondary detector itself in the collimated or near-collimated space. The pick-off is preferably fixed to maximize detection of any transient optical events but could be switched.

A secondary detector 134 is positioned to receive and measure the sampled light multiple times per image frame to generate a signal voltage 136. The secondary detector is suitably a non-imaging analog device such as a photodetector including an avalanche photodiode (APD), p-i-n photodiode or Geiger mode photodiode. The photodetector must have sufficient bandwidth to sample the light multiple times per image frame in order to immediately detect and track the rise and fall of the transient optical event via signal voltage 136. For example, the photodetector may sample the light ten or even one hundred or more times per image frame. The secondary detector 134 can measure the light both during image frames and during any dead time between image frames to detect any transient that might affect image capture.

A Micro-Electro-Mechanical System (MEMS) Micro-Mirror Array (MMA) 140 is positioned in the collimated or near-collimated space 118. If collimated, the MEMS MMA is positioned at an intermediate pupil. The MMA includes a plurality of independently controllable mirrors 142, each said mirror responsive to command signals to tilt in at least one degree-of freedom (DOF). The MMA must have sufficient control bandwidth to react at least as fast as the secondary detector.

A controller 144 is responsive to the sampled light (e.g., signal voltage 136) to update the command signals multiple times per image frame to tilt a percentage of the mirrors 142 ("shut-down") to re-direct light incident on those mirrors to a light dump 146 and to tilt the remaining mirrors 142 ("active") to re-direct light incident on those mirrors to the image forming optics 120 to form the image on the imaging detector 122 whereby together the mirrors adjust a fraction of light reaching the imaging detector 122 such that the integrated incident light for a given image frame is less than the saturation threshold 126.

Because the MEMS MMA is positioned in collimated or near-collimated space, a portion of the light can be re-directed to the light dump without affecting the image. The mirrors that re-direct light to the light dump may be command to the same angle or different angles as required by the geometry of the optical system. The mirrors that re-direct light to the image forming optics are nominally commanded to the same angle. Additional commands may be superimposed onto the array of mirrors to perform additional optical functions such as wavefront correction or adding optical power to the system.

The controller may be configured to determine the number of mirrors and the pattern for those mirrors to dump a certain percentage of the light in real-time. Alternately, a plurality of pre-programmed mirror patterns that direct different percentages of light to the light dump may be stored in memory. The "pattern" can be any configuration of mirrors that re-directs the desired percentage of light through the system. To a $1^{st}$ order, the pattern selection will not affect the image. The pattern may take any form, including randomly distributed, inside to out, left to right, up to down etc. In either case, the controller may be configured to respond to the amplitude of the sampled light (possibly integrated over some short sampling period) to either determine or select the mirror pattern.

As shown in FIG. 3, for purposes of illustration, transient optical events 150 and 152 occur in both the $1^{st}$ and $3^{rd}$ image frames in which the radiant exposure 130 over the image frame would exceed the saturation threshold 126 and cause loss of several image frames if undetected and uncompensated. The secondary detector's high bandwidth voltage signal 136 closely tracks the rise and fall of the transient optical events 150 and 152. Controller 144 monitors voltage signal 136 and generates a correction signal 154 that indicates whether any of the light needs to be re-directed to the light dump and, if so, what percentage. The controller processes the correction signal to determine what mirrors to actuate and generates the command signals to drive the MEMS MMA. The transient optical event 150 in the $1^{st}$ frame is larger than the transient optical event 152 in the $3^{rd}$ frame. Accordingly, the controller selects 40% of the mirrors to re-direct light to the light dump in the 1 frame and only 28% of the mirrors in the $3^{rd}$ frame. As illustrated, correction signal 154 responds quickly to the onset of the transient optical events and tracks the rise and fall of the events. The percent of mirrors selected to re-direct light to the light dump will rise and fall with the corrected signal and underlying transient optical event. As such, the adjusted radiant exposure 156 in the $1^{st}$ and $3^{rd}$ frames does not exceed the saturation threshold 126. The result is only a partial aperture shutdown during the transient optical event with no loss of frame. All of the state information in the FIR propagates through the transient optical events with causing any degradation or need for recovery.

The mirrors in the MEMS MMA must tilt in at least one DOF to selectively re-direct light to the light dump and the imaging detector via the image forming optics. In some embodiments, the mirrors will be configured to tilt in two DOF. In an embodiment, the mirrors are configured to tip, tilt and piston in three DOF.

Figure 5A:
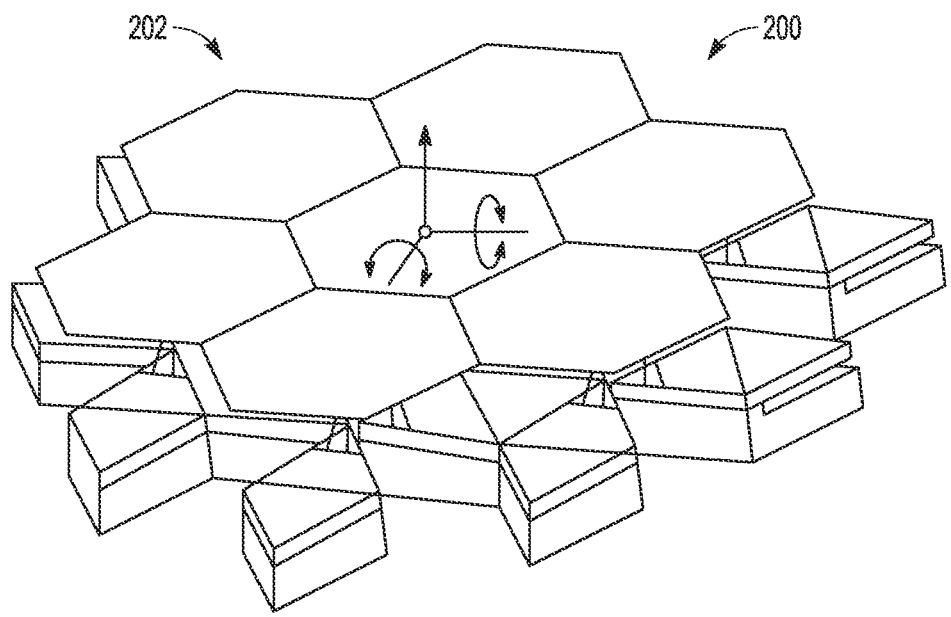
FIGS. 5A and 5B are illustrations of a known embodiment of a Tip/Tilt/Piston ("TTP") MEMS MMA and a single mirror actuated to tip, tilt and piston.
Figure 5B:
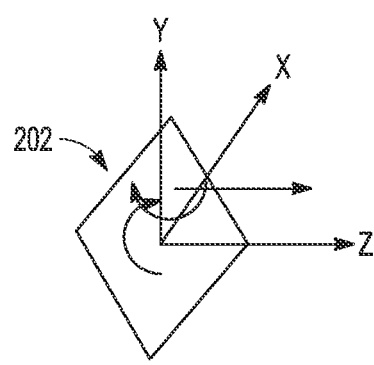

As best shown in FIGS. 5A-5B, an exemplary Micro-Electro-Mechanical System (MEMS) Micro-Mirror Array (MMA) 200 comprises a plurality of independently and continuously controllable mirrors 202 to re-direct light in three DOF. Each mirror is capable of at least "Tip" (rotation about an X-axis), "Tilt" (rotation about a Y-axis and "Piston" (translation along a Z-axis, perpendicular to the XY plane) where the X, Y and Z are orthogonal axes in a three-dimensional space.

The MEMS MMA is preferably capable of tipping and tilting over range of at least −15°×+15° to steer over a range of +/−30°×30° and pistoning (translating) over a range of at least +/−15 microns (at least one-half wavelength in either direction) piston at a rate of at least 1 KHz (<1 millisecond). Further, the MEMS MMA must have a sufficient number of mirrors, mirror size/resolution, fill factor, range of motion, response time, response accuracy and uniformity across the array.

Figure 1:
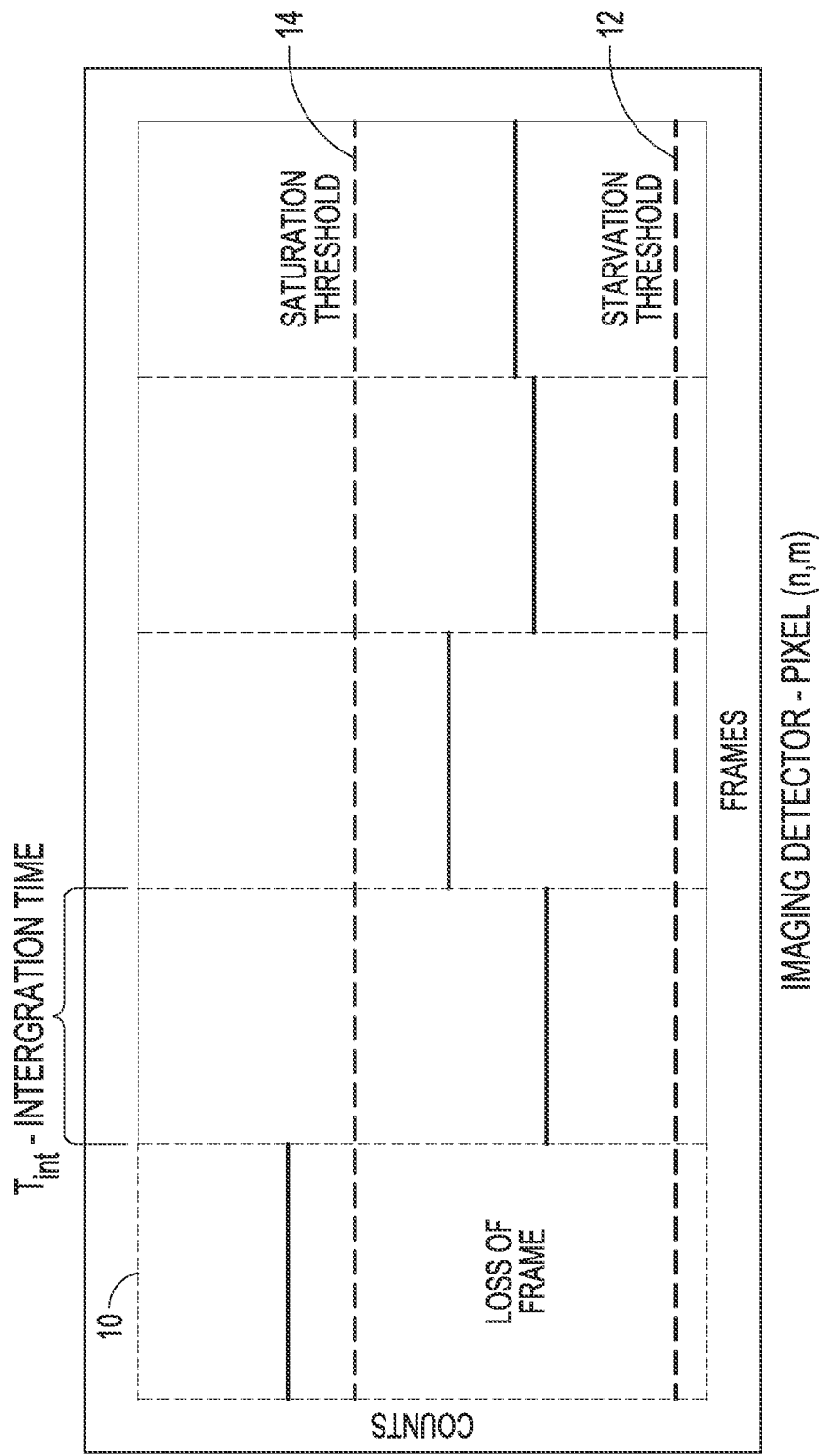
FIG. 1, as described above, is a plot of radiant exposure of an imaging detector for an EO/IR imaging system.

One such MEMS MMA is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures to support each mirror at three fulcrum points (or vertices) of an equilateral triangle. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

As previously mentioned, the MEMS MMA may also be controlled to perform additional optical functions on the light in the collimated or near-collimated space to, for example, perform wavefront correction or to add optical power. For example, the remaining mirrors may be commanded to independently piston orthogonal to the XY plane to superimpose a pixelated offset pattern on the light in collimated space to, for example, perform wavefront correction. For example the remaining mirrors may be commanded to independently tilt (from the nominal tilt angle) to superimpose a pixelated tilt pattern on the light in collimated space to, for example, add optical power. The tilt and piston may be used individually or in combination to perform other optical functions.

Figure 6:
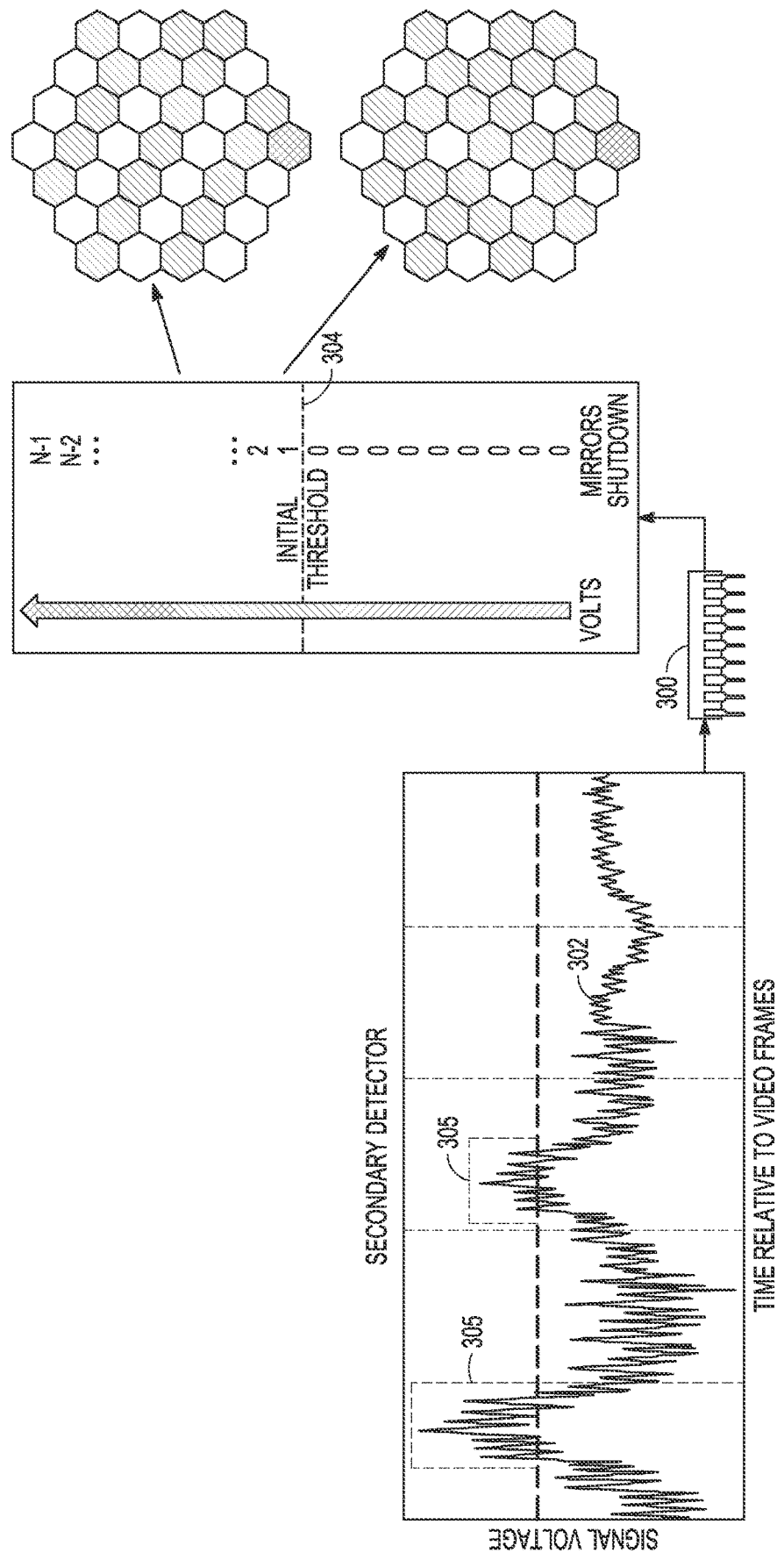
FIG. 6 is a diagram in which the sampled light is compared to a threshold to select a pre-programmed mirror patterned to dump a prescribed fraction of the light to prevent saturation.

Referring now to FIG. 6, in an embodiment, a comparator 300 compares the secondary detector's voltage signal 302 against an initial threshold 304 to trigger correction based on the occurrence of a transient event 305 and additional higher thresholds 306 to allocate higher and higher percentages of mirrors to re-direct light to the light dump. If the voltage signal 302 is less than initial threshold 304 than no transient event is detected and 0% of the mirrors are shut down to re-direct to the light dump. If the voltage signal 302 exceeds initial threshold 304 a % of mirrors equivalent to an output of 0 are shutdown and so forth as the voltage signal increases. This is analogous to a thermometer. If the voltage signal is "cold", the comparator output is 0 and none of the mirrors are shut down. If the temperature exceeds a threshold the controller starts to shut mirrors down and shut a higher % down as the temperature rises. The comparator based only on the detector's voltage signal 302 is a simple yet effective way to control the % of mirrors shut down.

Referring now to FIGS. 7A and 7B, in addition to the secondary detector's voltage signal, the controller may consider other $2^{nd}$ order factors to determine if and when mirrors should be shut down and what percentage. For example, the controller may consider one or more derivatives of the voltage signal (e.g., is the amplitude increase or decreasing and if so at what rate). If the derivative is positive, the controller may dump more light than would otherwise be dictated by just the amplitude or vice-versa as illustrated plot 400 in FIG. 7A. The controller may also consider at what point in the frame the transient event occurs. If the event occurs early in the frame, the controller may dump more light than if the event occurs later in the frame as illustrated in plot 402 in FIG. 7B. The controller may combine all three factors in deciding if, when and what % of mirrors to shut down.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A EO/IR optical imaging system comprising:
   an afocal telescope configured to collect light from a scene into a collimated space;
   image forming optics configured to receive light from the collimated space and focus light to form an image at an image plane;
   an imaging detector positioned at the image plane and configured to integrate incident light over an image frame and readout a sequence of pixelated images at a frame rate, said detector exhibiting a saturation threshold;
   a light dump;
   a pick-off positioned in the collimated space to sample the light;
   a secondary detector configured to measure the sampled light multiple times per image frame;
   a Micro-Electro-Mechanical System (MEMS) Micro-Mirror Array (MMA) positioned at an intermediate pupil in the collimated space, said MMA comprising a plurality of independently controllable mirrors, each said mirror responsive to command signals to tilt in at least one degree-of freedom (DOF); and
   a controller responsive to the sampled light to update the command signals multiple times per image frame to tilt a percentage of the mirrors to re-direct light incident on those mirrors to the light dump and to tilt the remaining mirrors to re-direct light incident on those mirrors to the image forming optics to form the image on the imaging detector whereby together the mirrors adjust a fraction of light reaching the imaging detector such that the integrated incident light for a given image frame is less than the saturation threshold.

2. The EO/IR optical imaging system of claim 1, wherein the pick-off comprises one or more of the MMA mirrors.

3. The EO/IR optical imaging system of claim 1, wherein the secondary detector comprises an analog avalanche photodiode (APD).

4. The EO/IR optical imaging system of claim 1, wherein each said mirror in the MEMS MMA is responsive to command signals to tilt in at least two DOF.

5. The EO/IR optical imaging system of claim 1, wherein the MEMS MMA includes a plurality of mirrors configured to tip, tilt and piston in three DOF.

6. The EO/IR optical imaging system of claim 5, wherein each said mirror rotates about X and Y orthogonal axes, respectively, and translates in a Z axis orthogonal to the XY plane to tip, tilt and piston, respectively.

7. The EO/IR optical imaging system of claim 6, wherein each said mirror is supported at three vertices of a triangle, wherein lines defined by three different pairs of said vertices provide three axes at 60 degrees to one another in the XY plane, wherein each said mirror pivots about each said axes to produce tilt, tip and piston in the XYZ space.

8. The EO/IR optical imaging system of claim 6, wherein the remaining mirrors are responsive to command signals to independently piston orthogonal to the XY plane to superimpose a pixelated offset pattern on the light in collimated space.

9. The EO/IR optical imaging system of claim 1, wherein the remaining mirrors are responsive to command signals to independently tilt to superimpose a pixelated tilt pattern on the light in collimated space.

10. The EO/IR optical imaging system of claim 1, further comprising a plurality of pre-programmed mirror patterns that direct different percentages of the light to the light dump, wherein said controller is responsive to the sampled light to select and apply one of the pre-programmed mirror patterns to the MEMS MMA multiple times per image frame.

11. The EO/IR optical imaging system of claim 10, wherein the controller is responsive to an amplitude of the sampled light and at least on of a derivative of sampled light and a sub-frame location of the sample within the image frame.

12. The EO/IR optical imaging system of claim 1, wherein the controller is responsive in real-time to an amplitude of the sampled light and at least on of a derivative of sampled light and a sub-frame location of the sample within the image frame to determine the percentage of mirrors to re-direct light to the dump.

13. A EO/IR optical imaging system comprising:
   collections optic configured to collect light from a scene;
   image forming optics configured to receive collected light from the collimated space and focus light to form an image;
   an imaging detector configured to integrate incident light over an image frame and readout a sequence of pixelated images at a frame rate, said detector exhibiting a saturation threshold;

a light dump;

a pick-off positioned in the collimated space to sample the light;

a secondary detector configured to measure the sampled light multiple times per image frame;

a Micro-Electro-Mechanical System (MEMS) Micro-Mirror Array (MMA) positioned at an intermediate pupil in the collimated space, said MMA comprising a plurality of independently controllable mirrors, each said mirror responsive to command signals to tilt in at least one degree-of freedom (DOF); and a controller responsive to the sampled light to update the command signals multiple times per image frame to tilt a percentage of the mirrors to re-direct light incident on those mirrors to the light dump and to tilt the remaining mirrors to re-direct light incident on those mirrors to the image forming optics to form the image on the imaging detector whereby together the mirrors adjust a fraction of light reaching the imaging detector such that the integrated incident light for a given image frame is less than the saturation threshold.

14. The EO/IR optical imaging system of claim 13, wherein each said mirror rotates about X and Y orthogonal axes, respectively, and translates in a Z axis orthogonal to the XY plane to tip, tilt and piston, respectively, in three DOF.

15. The EO/IR optical imaging system of claim 14, wherein each said mirror is supported at three vertices of a triangle, wherein lines defined by three different pairs of said vertices provide three axes at 60 degrees to one another in the XY plane, wherein each said mirror pivots about each said axes to produce tilt, tip and piston in the XYZ space.

16. The EO/IR optical imaging system of claim 14, wherein the remaining mirrors are responsive to command signals to independently piston orthogonal to the XY plane to superimpose a pixelated offset pattern on the light in collimated space.

17. The EO/IR optical imaging system of claim 13, further comprising a plurality of pre-programmed mirror patterns that direct different percentages of the light to the light dump, wherein said controller is responsive to the sampled light to select and apply one of the pre-programmed mirror patterns to the MEMS MMA multiple times per image frame.

18. A method of preventing saturation of an imaging detector in an EO/IR optical imaging system, said system including collection optics that collect light that is passed to image forming optics that focus the light onto an imaging detector that integrates the incident light over a frame time and reads out images at a frame rate, said imaging detector having a saturation threshold, said method comprising:

positioning a Micro-Electro-Mechanical System (MEMS) Micro-Mirror Array (MMA) in a collimated or near-collimated space between the collection optics and the image forming optics, said MMA comprising a plurality of independently controllable mirrors, each said mirror responsive to command signals to tilt in at least one degree-of (DOF);

sampling the collimated or near-collimated light multiple times per image frame;

responsive to the sampled light, updating the command signals multiple times per image frame to tilt a percentage of the mirrors to re-direct light incident on those mirrors to a light dump and to tilt the remaining mirrors to re-direct light incident on those mirrors to the image forming optics to form the image on the imaging detector whereby together the mirrors adjust a fraction of light reaching the imaging detector such that the integrated incident light for a given image frame is less than the saturation threshold.

19. The method of claim 18, wherein each said mirror rotates about X and Y orthogonal axes, respectively, and translates in a Z axis orthogonal to the XY plane to tip, tilt and piston, respectively, in three DOF.

20. The method of claim 19, further comprising commanding the remaining mirrors to independently piston orthogonal to the XY plane to superimpose a pixelated offset pattern on the light in collimated space.

21. The method of claim 18, further comprising:

storing a plurality of pre-programmed mirror patterns that direct different percentages of the light to the light dump; and responsive to the sampled light multiple times per image frame, selecting and applying one of the pre-programmed mirror patterns to the MEMS MMA.

* * * * *

UNITED STATES PATENT AND TRADEMARK OFFICE
CERTIFICATE OF CORRECTION

| | | |
|---|---|---|
| PATENT NO. | : 11,936,991 B2 | Page 1 of 1 |
| APPLICATION NO. | : 17/397644 | |
| DATED | : March 19, 2024 | |
| INVENTOR(S) | : Wilds et al. | |

It is certified that error appears in the above-identified patent and that said Letters Patent is hereby corrected as shown below:

In the Specification

In Column 6, Line 8, delete "1" and insert --$1^{st}$-- therefor

Signed and Sealed this
Seventeenth Day of December, 2024

Derrick Brent
*Acting Director of the United States Patent and Trademark Office*